United States Patent [19]

Olschewski et al.

[11] 4,340,135

[45] Jul. 20, 1982

[54] CLUTCH RELEASE DEVICE

[75] Inventors: Armin Olschewski, Schweinfurt; Manfred Brandenstein, Eussenheim; Lothar Walter; Heinrich Kunkel, both of Schweinfurt, all of Fed. Rep. of Germany

[73] Assignee: SKF Kugellagerfabriken GmbH, Schweinfurt, Fed. Rep. of Germany

[21] Appl. No.: 126,437

[22] Filed: Mar. 3, 1980

[30] Foreign Application Priority Data

Apr. 7, 1979 [DE] Fed. Rep. of Germany ... 7910203[U]

[51] Int. Cl.³ .............................................. F16D 23/14
[52] U.S. Cl. ..................................... 192/98; 192/99 S; 192/110 B; 308/233; 403/261
[58] Field of Search ...................... 192/98, 99 S, 110 B; 308/233; 403/261

[56] References Cited

U.S. PATENT DOCUMENTS 3,973,659 8/1976 Ernst et al. ................... 308/233 X
4,013,327 3/1977 Kunkel et al. ................. 192/98 X
4,159,052 6/1979 Ernst et al. ...................... 192/98
4,201,282 5/1980 Ernst et al. ...................... 192/98

FOREIGN PATENT DOCUMENTS 2005892 8/1971 Fed. Rep. of Germany.
7821321 10/1978 Fed. Rep. of Germany.

Primary Examiner—Rodney H. Bonck
Attorney, Agent, or Firm—Daniel M. Rosen

[57] ABSTRACT

A clutch release device has a pressure plate mounted on a sliding sleeve, and a stationary ring of a bearing abut one side of the pressure plate. A clutch lever abuts the other side of the pressure plate, and is held from axial removal by a ring having a flexible outer rim. The holding ring is held to the pressure plate by a flange on the sliding sleeve. The clutch lever has a central aperture fitted over a central conical portion of the pressure plate, the aperture having a pair of inwardly directed projections. The outer diameter of the holding ring is greater than the distance between the facing ends of the projections.

7 Claims, 3 Drawing Figures

CLUTCH RELEASE DEVICE

This invention relates to a clutch release device, especially for truck clutches, consisting of a pressure plate or the like, and having a sliding sleeve as well as a clutch thrust bearing connected thereto. The fixed ring of the bearing engages the pressure plate, and is mounted so as to avoid axial movement as well as relative rotation with respect to the pressure plate. In this arrangement, the clutch lever is affixed to the pressure plate or the like by way of corresponding connection elements.

A clutch release arrangement of this type is disclosed, for example, in Pat. No. DE-OS 2,005,892 of the Federal Republic of Germany. In the arrangement disclosed in this publication, the clutch lever is affixed to a housing by way of a shaped spring, which is formed to be combined with a sheet metal holding element affixed to the housing.

This known construction has the disadvantage that the holding spring with the combined sheet metal holding element is a relatively complicated component, and that the assembly of the clutch release device with the clutch lever is quite involved. Further, the holding spring can break under strong vibration forces.

In addition, Pat. No. DE-GM 7,821,321 of the Federal Republic of Germany discloses a clutch device in which a circular holding part is provided with two diametrically opposite receiving portions for the coupling lever, these portions meshing in openings of the sliding sleeve. This arrangement is also relatively expensive to produce.

It is therefore the object of the present invention to provide a coupling release device of the above disclosed type, in which the holding device for the clutch lever can be produced in a simple and inexpensive manner, and in which the clutch lever can be affixed to the device easily by snapping it into position.

Briefly stated, in accordance with the invention, a ring is held between the pressure plate and a flange of the sliding sleeve. The outer rim of the ring is elastic, and the outer diameter of this ring is greater than the distance between the facing surfaces of a pair of projections in the bore of the clutch lever. This arrangement enables the easy assembly of the clutch lever. By springing back to its original position after assembly, the rim of the ring thereby provides a positive connection between the clutch release device and the clutch lever, so that the clutch release device will not turn with respect to the clutch lever.

In order that the invention will be more clearly understood, it will now be disclosed in greater detail with reference to the accompanying drawing, wherein.

Figure 1:
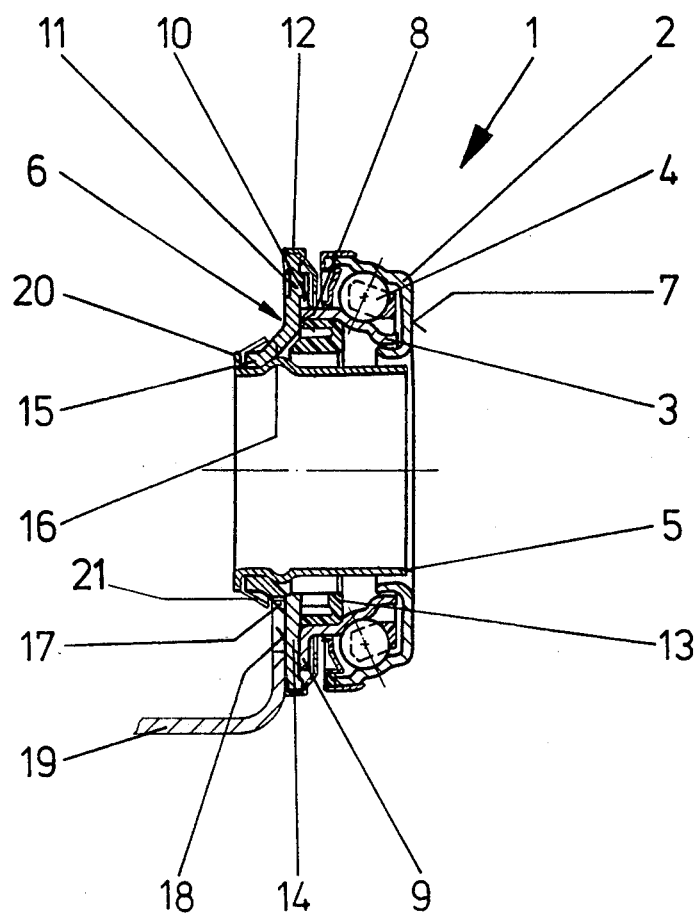
FIG. 1 is a cross-sectional view of a clutch release bearing according to the invention.

Referring now to the drawings, and particularly to FIG. 1, there and is illustrated a clutch release device comprised of a clutch thrust bearing 1 having sheet metal bearing rings 2 and 3. A plurality of balls 4 held in a cage are arranged between the bearing rings 2 and 3. The bearing further includes a sliding sleeve 5 radially inward of the bearing rings, and a pressure plate 6. The rotatable outer ring 2 of the clutch thrust bearing 1 has a radially extending surface 7 adapted to engage the diaphragm spring (not shown) of the clutch. The fixed bearing ring 3 engages the radially extending surface 8 of the pressure plate 6, and is radially displaceable thereon. In order to insure that the stationary bearing ring 3 will not turn, a radially extending flange 9 of the bearing ring 3 is provided with at least one recess 10. A projection 11 formed on the surface 8 of the pressure plate 6 extends into the recess 10. The holding of the clutch thrust bearing 1 in the axial direction is achieved by means of a sheet metal cap or cowl 12. The outer rim of the cowl 12 is affixed to the outer rim of the pressure plate and the inner end of the cowl extends behind the flange 9 of the bearing ring 3. A ring 13 of an elastic material is provided in the bore of the bearing ring 3, for damping large radial displacement of the bearing, for example, due to intense road shocks.

Figure 2:
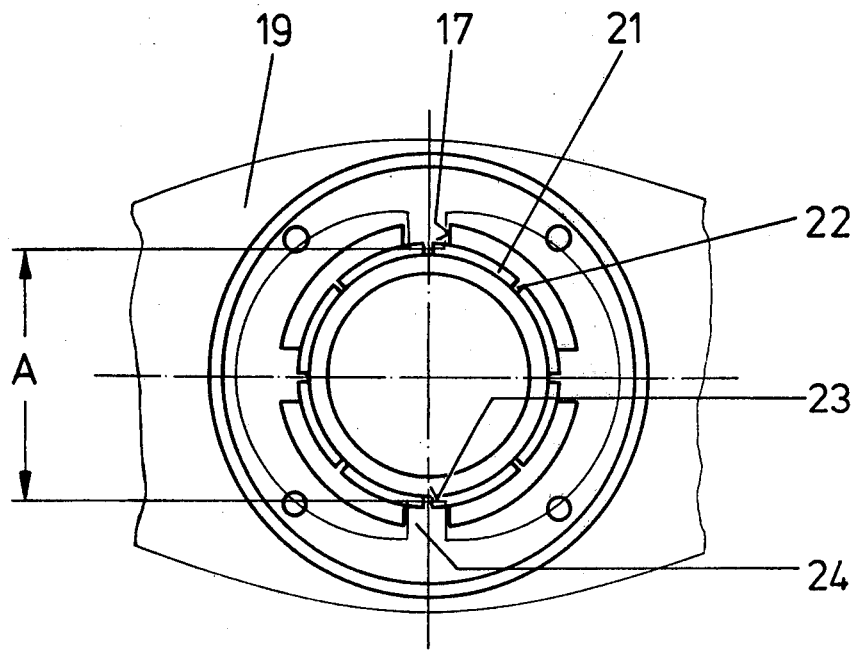
FIG. 2 is a side view of the clutch release bearing illustrated in FIG. 1.
Figure 3:
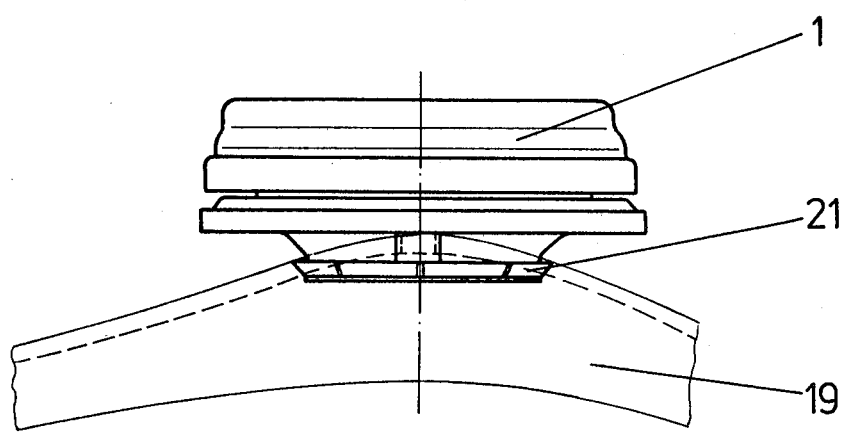
FIG. 3 is a top view of the clutch release bearing of FIG. 1.

The pressure plate 6 is provided with a conical section 16 between the radially directed outer flange 14 and a cylindrical part 15 that lays on the sliding sleeve 5. The conical section 16 has at least two diametrically opposite slots 17, as is more apparent in FIG. 2. The slots 17 extend in the axial direction to the support surface 18 for clutch lever 19. The thin ring 21 is provided between the pressure plate 6 and the radially outwardly directed flange 20 of the sliding sleeve 5. The outer edge of the ring 21 is angled toward the clutch and is provided with several slits 22, as is more clearly seen in FIG. 2. The outer diameter of the ring 21 is larger than the distance A between the surfaces 23 of the projections 24 of the clutch lever 19 that are directed toward one another, so that the outer rim of the ring 21 is elastically inwardly bent back during the assembly of the clutch lever 19 onto the pressure plate 6. After the guiding of the clutch lever 19 into the slots 17, the outer rim of the ring 21 springs back to its original position and thereby secures the clutch lever in one axial direction. In the other axial direction the clutch lever 19 abuts the support surface 18 of the pressure plate 6, and the pressure plate 6 and the sliding sleeve connected thereto are secured against turning by the projections 24 of the clutch lever 19, which extends into the slots 17 of the conical section 16.

While the invention has been disclosed and described with reference to a single embodiment, it is apparent that variations and modifications may be made therein without departing from the invention. For example, changes may be made in the construction of the individual parts, without departing from the invention. It is therefore intended in the following claims to cover each such variation and modification as falls within the true spirit and scope of the invention.

What is claimed is:

1. In a clutch release device including a pressure plate, a sliding sleeve extending into and connected to the pressure plate, and a clutch thrust bearing having a stationary bearing ring axially abutting the pressure plate, the stationary bearing ring being secured in the axial direction and against turning with respect to the pressure plate, and a clutch lever affixed to the pressure plate by means of corresponding interconnecting elements; the improvement wherein the sliding sleeve has a flange on the side thereof away from the stationary bearing ring, wherein a holding ring is provided between the flange of the sliding sleeve and the pressure plate, the holding ring having an elastic outer rim, the clutch lever having an aperture with radially opposite inwardly directed projections, the outer diameter of the holding ring being greater than the distance between the surfaces of the projections of the clutch lever that are directed toward one another, the clutch lever being held against said pressure plate by said holding ring.

2. The clutch release device of claim 1 wherein the outer rim of the holding ring is angled toward the pressure plate and is provided with a plurality of slits distributed about its circumference.

3. The clutch release device of claim 1 wherein the pressure plate has a conical section between an outer radially extending flange and an inner cylindrical part engaging the sliding sleeve.

4. The clutch release device of claim 3, wherein the pressure plate has at least two diametrically opposite slots in the region of the conical section, the slots extending in the axial direction to the opposite radial surface of the pressure plate, said stationary bearing ring abutting said opposite surface.

5. A clutch release device comprising a sliding sleeve, an annular pressure plate mounted co-axially on said sliding sleeve and having an outer radially extending portion, an inner cylindrical portion fitted over said sliding sleeve, and a central conical section, a bearing including a stationary bearing ring abutting one side of said radially extending portion, said conical section and cylindrical portion extending away from said bearing ring, a clutch lever having an aperture fitted over said conical portion and abutting the other side of said pressure plate, said aperture having a pair of diametrically opposite inwardly directed projections, a holding ring fitted over said sleeve adjacent said cylindrical portion, said holding ring having a flexible outer rim angled toward said outer radially extending portion of said pressure plate and axially holding said clutch lever with respect to said pressure plate, and a flange on said sleeve positioned to hold said ring against the end of said cylindrical portion, the outer diameter of said holding ring being greater than the distance between the facing ends of said projections.

6. The clutch release device of claim 5 comprising means for axially holding said stationary bearing ring with respect to said pressure plate.

7. The clutch release device of claim 5 wherein said conical section has slits extending axially therethrough in the region of said outer radially extending portion, said projections of said clutch lever extending into said slits.

* * * * *